(12) United States Patent
Flores et al.

(10) Patent No.: US 12,175,477 B1
(45) Date of Patent: Dec. 24, 2024

(54) SYSTEMS AND METHODS FOR TITLES AND TITLE INSURANCE FOR NON-FUNGIBLE TOKENS

(71) Applicant: UNITED SERVICES AUTOMOBILE ASSOCIATION (USAA), San Antonio, TX (US)

(72) Inventors: Christopher E. Flores, San Antonio, TX (US); Jennifer M. Chandler-Bradley, Tampa, FL (US); Elena M. Carrasco, Converse, TX (US); Keegan P. Hayes, Whitestown, IN (US); Nikhil Dama, Apex, NC (US); Yibin Xu, San Antonio, TX (US); Neetu Jain, Coppell, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/827,587

(22) Filed: May 27, 2022

(51) Int. Cl.
*G06Q 30/018* (2023.01)
*G06Q 40/08* (2012.01)

(52) U.S. Cl.
CPC .......... *G06Q 30/018* (2013.01); *G06Q 40/08* (2013.01)

(58) Field of Classification Search
CPC ............................ G06Q 40/08; G06Q 30/018
USPC ............................................................ 705/4
See application file for complete search history.

(56) References Cited

U.S. PATENT DOCUMENTS

| | | | |
|---|---|---|---|
| 9,974,775 B2 * | 5/2018 | Ahmad | A61K 31/506 |
| 2020/0387975 A1 * | 12/2020 | Spangenberg | G06Q 20/123 |
| 2022/0309491 A1 * | 9/2022 | Shapiro | G06F 21/64 |

* cited by examiner

*Primary Examiner* — Robert R Niquette
(74) *Attorney, Agent, or Firm* — BakerHostetler

(57) ABSTRACT

A non-fungible token (NFT) representing title to property may be received. A search of the title to the property may be conducted. A title confidence may be determined based on the search of the title to the property. A premium may be determined based on the title confidence. The premium may be redetermined based on changes to the title confidence.

20 Claims, 6 Drawing Sheets

SYSTEMS AND METHODS FOR TITLES AND TITLE INSURANCE FOR NON-FUNGIBLE TOKENS

BACKGROUND

Blockchain networks continue to evolve and impact all aspects of business. Non-fungible tokens ("NFT's") have come to the forefront of these markets as a manner of establishing ownership of unique assets (as opposed to fungible tokens such as a bitcoin or fraction thereof) on a blockchain.

SUMMARY

A method for titles and title insurance for NFT's may include receiving an NFT. The NFT may represent title to property. A search may be conducted of the title. Based on the search, a dynamic title confidence may be determined. Based on the dynamic title confidence, a premium may be determined for insuring the title. The premium may be redetermined based on changes to the dynamic title confidence.

A system for titles and title insurance for NFT's may include an ingestion component configured to receive a non-fungible token (NFT) representing title to property. The system may include a search component configured to conduct a search of the title to the property. The system may include a title confidence component configured to determine a dynamic title confidence based on the search of the title to the property. The system may include a title insurance component configured to determine a premium based on the dynamic title confidence. The title insurance component may be configured to redetermine the premium based on changes to the dynamic title confidence.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The following drawings show generally, by way of example, but not by way of limitation, various examples discussed in the present disclosure. In the drawings.

DETAILED DESCRIPTION

A non-fungible token (NFT) is a unique and non-interchangeable unit of data stored on a blockchain and representing a unique asset. An NFT may function as a certificate of ownership, authenticity, origin, uniqueness, and/or permanence of a particular digital asset (e.g., an image, gif, video, audio, game, ticket, and/or another type of digital files) or a particular physical asset. The NFT may include a license to the asset for a specified purpose, such as to use, copy, or display the asset for personal or commercial purposes. NFT's can be stored in digital wallets. NFT's can be exchanged using blockchain transactions. NFT's leverage blockchain technology to establish a verified and public proof of ownership of NFT's. Like cryptographic tokens and/or cryptocurrency, NFT's can be traded on a blockchain. However, unlike cryptographic tokens and/or cryptocurrency, NFT's are not mutually interchangeable (e.g., not "fungible"). Because different NFT's are associated with different underlying assets, they differ in value.

To date, NFT licenses are not well-understood, poorly implemented, and difficult to police. Many NFTs that are minted are transferred to their eventual owners or licensees subject to various restrictions, and the content embodied in an NFT is often used or repurposed by entities who do not possess any right to use those NFTs. The different blockchains, technology standards (or non-standard technologies), and general complexities presented by the internet and growing network connectivity of myriad devices create new problems with establishing ownership, enforcing terms of use, and preventing misappropriation that do not have analogs in, for example, art markets involving real-world paintings or sculptures. However, given the interest in NFTs and the value of NFTs, it is paramount that the transparency and consistency promised by blockchain technology be carried through to NFTs. This technology is not yet well-understood, but has significant ramifications in a number of markets that will benefit from the greater control and consistency afforded by the technology disclosed herein.

Figure 1:
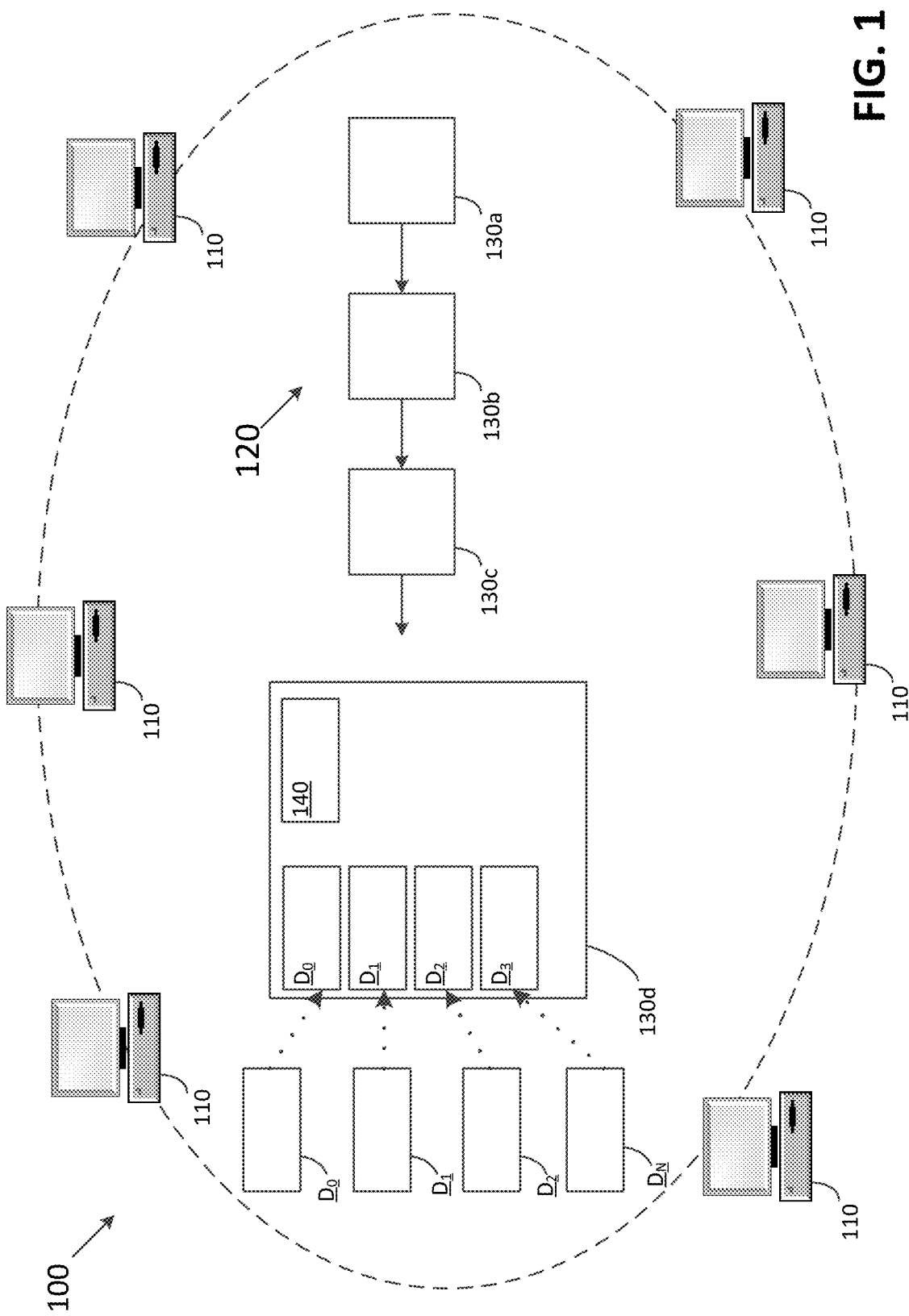
FIG. 1 shows an example distributed system architecture.

FIG. 1 shows an example distributed system 100 that may maintain a blockchain 120 storing one or more NFT's. The distributed system 100 may comprise a peer-to-peer network. The distributed system 100 may comprise a network of nodes 110. A node 110 may comprise a computing device, a central processing unit, a graphical processing unit, a field programmable gate array, or an application specific integrated circuit. A node 110 may comprise an Internet of Things ("IoT") device, such as a device with computing capabilities or network connectivity capabilities.

The network of nodes 110 may function as a decentralized database—a database without a central administrator or centralized storage. For example, each node 110 in the network may store a copy of a collection of data, such as entries and/or transactions. The data may be replicated, shared, or synchronized across the nodes 110. The decentralized database may be continually reconciled, such as to reflect changes to the collection of data. The nodes 110 may continually or periodically transmit or download the most recent version of the collection of data, such as from each other. When a node 110 joins the network, the node 110 may automatically download the collection of data, such as from one of the other nodes 110.

The decentralized database may comprise the blockchain 120. A blockchain 120 may comprise one or more blocks 130 in which data is recorded. The blocks 130 in the blockchain 120 may be function as a mechanism to organize the data in the blockchain 120. For example, the blocks 130 may be linked in a sequence determined by a relationship of the data in the blocks 130, such as the chronology in which the data is recorded or validated. The blocks 130 may be linked to deter retroactive modification of data in the blockchain 120.

The nodes 110 in the network may build the blockchain 120, such as by adding blocks 130 to the blockchain 120. The nodes 110 may perform several operations to build the blockchain 120. For example, when new data $D_0$, $D_1$, $D_2$, DN is received by the network, the nodes 110 may validate the new data $D_0, D_1, D_2$, DN. As an example, if the new data $D_0, D_1, D_2$, DN comprises transactions, the nodes 110 may validate, verify, or authenticate the identity of the parties to the transaction. A transaction may comprise an indication of an NFT, such as a web address or uniform resource locator (URL) to the NFT. The transaction may comprise an indication of a party transferring the NFT and/or a party receiving the NFT, such as public keys, wallet addresses, and/or digital signatures of the parties. The digital signature may comprise the hash of transaction data, such as with a cryptographic hash function. The digital signature may comprise a hash of transaction data encrypted with a private key corresponding to the public key. Examples of hash functions include MD4, MD5, SHA-1, SHA-256, SHA-512, and SHA-3. The digital signature may be validated by the nodes 110, such as by decrypting the digital signature using the public key. The digital signature may allow for verification of the transaction while maintaining the anonymity of the parties to the transaction.

The nodes 110 may collate the new data $D_0, D_1, D_2$, DN into a new block 130*d*. The nodes 110 may perform an operation to add the new block 130*d* to the chain 120. For example, if the data in the blocks 130 is related chronologically, such as where the first block 130*a* in the chain records older data than the data of subsequent blocks 130*b*, 130*c*, the nodes 110 may perform a timestamp function to log the sequence in which blocks 130 are added to the blockchain 120. The nodes 110 may append a hash of the previous block 130*c* to the new bock 130*d*. The nodes 110 may insert an output of the previous block 130 in an input of the new block 130*d*. The chaining of the blocks, such as through iterative functions, may deter retroactive modification of data in a block 130 as the modification would require new functions to be performed for all of the subsequent blocks 130 in the chain 120.

The nodes 110 may be incentivized to perform the operation to add a new block 130*d* to the blockchain 120. For example, a block 130*d* may be assigned a value, such as a coin or unit of digital currency that will be transferred to one or more nodes 110 that perform part of all of the operation. A digital currency may comprise a cryptocurrency, such as Bitcoin, Litecoin, or TorCoin. The value may depend on the difficulty of performing the operation for the block 130*d*. Also, if the data $D_0, D_1, D_2$, DN recorded in a block 130*d* comprises transactions, a transaction may assign a transaction fee which may be transferred to one or more nodes 110 that perform the operation on the block 130*d* in which the transaction is recorded. If an incentive is provided for nodes 110 to perform the operation to add the new block 130*d* to the chain 120, performance of the operation may be referred to as mining.

Nodes 110 may work together to perform the operations to build the blockchain 120. For example, the nodes 110 may lend or combine their processing power, such as in a pool, to perform an operation to build the chain 120. If the nodes 110 work in tandem, incentives, such as the values of blocks or fees associated with transactions, may be divided amongst the nodes 110. For example, a node 110 may receive a portion of an incentive or transaction fee proportional to the contribution of the node 110 to the work to build a block or validate a transaction.

Once the operation is performed to add a new block 130*d* to the blockchain 120, the nodes 110 may communicate the new block 130*d* to the network. The nodes 110 may express their acceptance of the new block 130*d* to the chain 120 by working off the block 130*d* when performing the operation to add a subsequent block to the chain 120. If more than one version of the chain 120 exists, the nodes 110 may attempt to work off the longest chain 120. The longest chain 120 may be determined by an algorithm for scoring the chain 120. For example, a chain 120 may be assigned a score based on the computational work required to create the chain 120. A node 110 may communicate the longest chain 120 that the node 110 has observed to the network, such as with a gossip protocol.

The network may have self-correcting mechanisms, such as to address discrepancies between nodes 110 in the network. For example, if there is a fork in a blockchain 120, a node 110 working off one branch of the blockchain 120 may switch to a second branch of the blockchain 120 if the second branch becomes longer than the first branch. As another example, if a node 110 does not receive a block 130, the node 110 may request the block 130 when it receives the next block 130 and determines that it did not receive the previous block 130.

Figure 2:
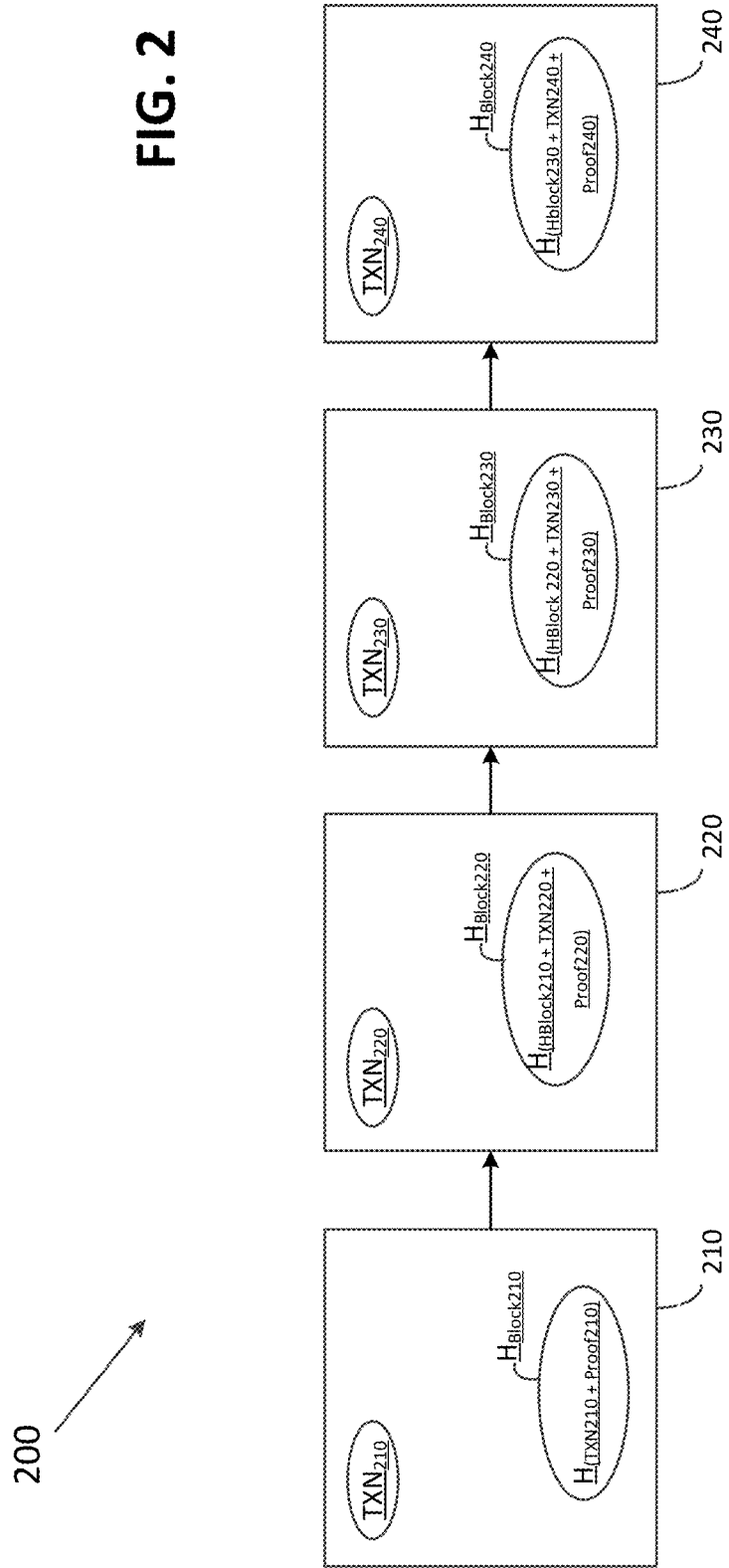
FIG. 2 shows an example blockchain architecture.

FIG. 2 shows an example blockchain 200. The blockchain 200 may be stored on nodes of a distributed system (e.g., nodes 110 in FIG. 1). The blockchain 200 may comprise or be similar to a Bitcoin blockchain, an Ethereum blockchain, a FLOW blockchain, a Tezos blockchain, or a Solana blockchain, as examples. The blockchain 200 may comprise one or more blocks 210, 220, 230, 240 in which one or more transactions, such as transactions exchanging NFT's, are recorded. The blocks 210, 220, 230, 240 may be linked in a sequence that represents the chronology of the execution, validation, or recording of the transactions. For example, the blockchain 200 may comprise a genesis block 210 that records the earliest transaction in the blockchain 200 and comprises the first block 210 in the blockchain 200. Each block 220, 230, 240 following the genesis block 210 may record a transaction that was executed, validated, and/or occurred after the transaction in the preceding block 210, 220, 230 in the blockchain 200 was executed, validated, and/or occurred. To illustrate, the block 230 may record transactions (TXN230) that were executed, validated, and/or occurred after the transactions recorded in the block 220 (TXN220) were executed, validated, and/or occurred. A new transaction may be recorded in a new block. The new block may be appended to the last or current block 240 in the blockchain 200. Although the example blockchain 200 is depicted as comprising 4 blocks 210, 220, 230, 240 the blockchain 200 may comprise less than 4 blocks or more than 4 blocks. The blocks 210, 220, 230, 240 may record transactions as hashes of the transactions ($H_{TXN210}, H_{TXN220}, H_{TXN230}, H_{TXN240}$).

The blocks 210, 220, 230, 240 may function as a mechanism to implement a timestamp server to generate computational proof of the chronological order of the transactions in the blockchain 200. A timestamp of a block 210, 220, 230, 240 may comprise a hash of the transactions (e.g., $TXN_{210}, TXN_{220}, TXN_{230}, TXN_{240}$) of the block 210, 220, 230, 240 and the transactions of the previous block in the blockchain 200. The timestamp may be recorded, such as by publishing. To eliminate the requirement to publish the timestamp, a distributed timestamp server may implement a protocol to achieve distributed chronological consensus, such as a proof protocol. A proof protocol may comprise a proof-of-work protocol, a proof-of-stake protocol, a proof-of-existence protocol, or another proof protocol.

A proof-of-work protocol may comprise solving for a proof (e.g., $Proof_{210}, Proof_{220}, Proof_{230}, Proof_{240}$), such as a string, a cryptographic nonce, or value, that when cryptographically hashed with the transactions of a block and a hash of the previous block yields a hash (e.g., $H_{Block210}$, $H_{Block220}$, $H_{Block230}$, $H_{Block240}$) with a pre-determined number of leading zero bits. For example, a proof may be identified such that the hash has 60 leading bits that are zero.

To illustrate, a proof-of-work for the block 220 may comprise solving for a value (e.g., $Proof_{220}$) that that when hashed with the transactions of the block 220 $TXN_{220}$ and the hash of the previous block 210 $H_{Block210}$ yields an output $H_{Block220}$ that has a pre-determined number of leading zero bits. The next block 230 in the blockchain 200 will be appended to the blockchain 200 when a proof-of-work is performed to identify a proof $Proof_{230}$ which when hashed with the transactions of the block 230 $TXN_{230}$ and the hash of the block 220 $H_{Block220}$ yields an output $H_{Block230}$ with a pre-determined number of leading zero bits. Once the proof is identified, the block 230 may be broadcast through the network. If the block 230 is accepted, the nodes may work on creating the next block 240 in the blockchain 200 using the hash ($H_{Block230}$) of the accepted block 230.

An iterative proof-of-work protocol may deter modification of a block in the chain as it would require re-doing the proof-of-work for each proceeding block in the chain 200. For example, modification of a transaction in the block 210 may require performance of a new proof-of-work for block 210, yielding a new hash ($H_{Block210}$) for the block 210. Consequently, a new proof-of-work may be required for the block 220 using the new hash ($H_{Block210}$) for the block 210, yielding a new hash ($H_{Block220}$) for the block 220. Each subsequent block in the chain 200 may require a new proof-of-work.

Figure 3:
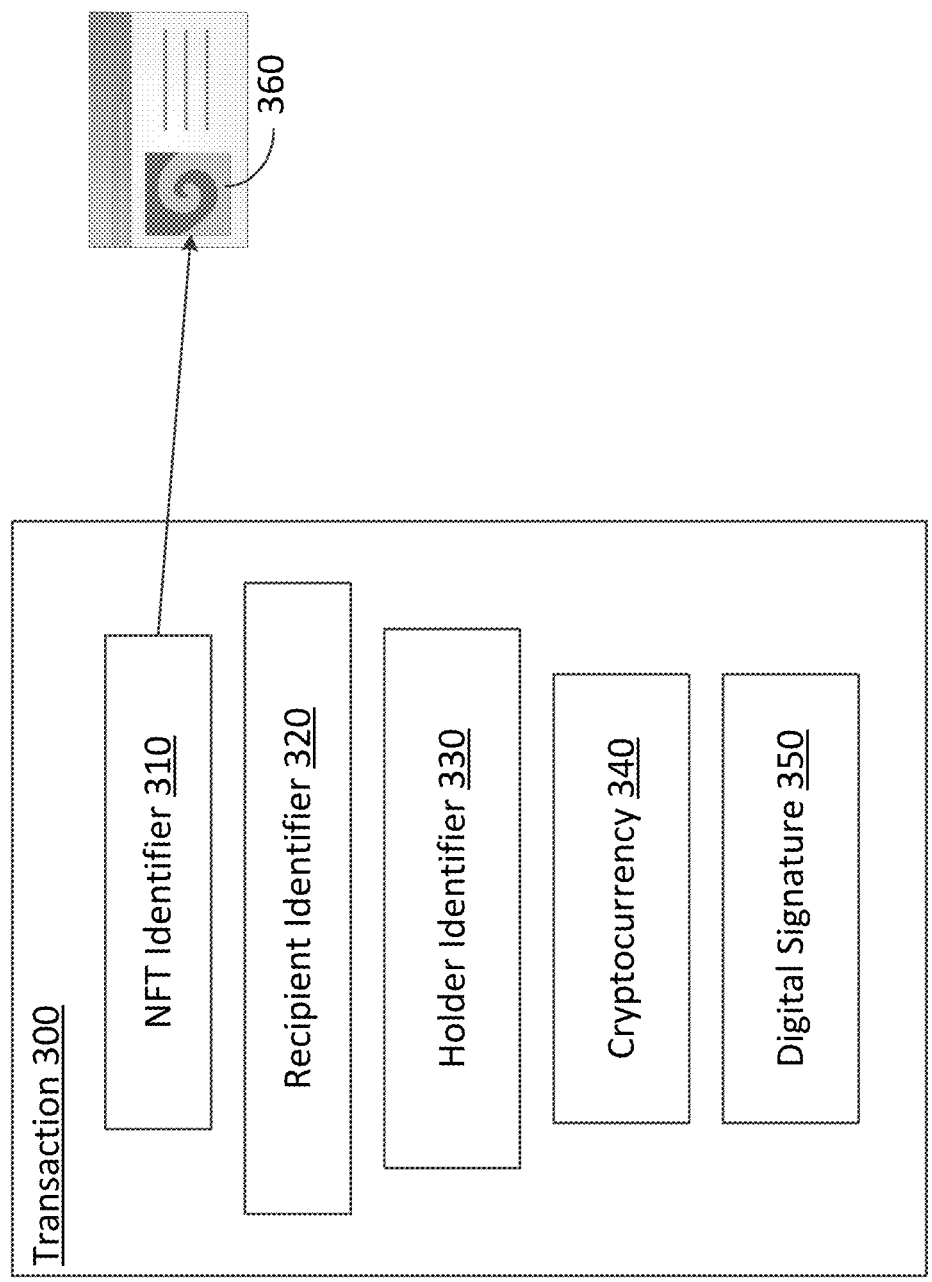
FIG. 3 shows an example NFT transaction.

FIG. 3 shows an example NFT transaction 300. An NFT may comprise a token, such as an ERC-721 token. A token may comprise a form of cryptocurrency or digital asset. Unlike a coin, a token is a type of cryptocurrency that is not tied to a specific blockchain. Instead, a token utilizes another coin's blockchain, or which may be built upon a given blockchain without having the same structure, characteristics, or function of a fungible asset implemented on said blockchain. For example, an ERC-721 token is built on the Ether (e.g., Ethereum) blockchain.

An NFT may consist of 2 parts—the asset 360 and a representation of the asset that lives on the blockchain. The part that lives on the blockchain may be the transaction 300 and/or an identifier of the NFT 310 in the transaction 300, such as a web address of the asset 360 or a unique token ID.

The transaction 300 may comprise a blockchain entry that effectuates the transfer of the NFT from a holder to a recipient. The transaction 300 may be similar to any of the transactions $TXN_{210}$, $TXN_{220}$, $TXN_{230}$, $TXN_{240}$ in FIG. 2. The transaction 300 may comprise the NFT identifier 310. The transaction 300 may comprise an identifier associated with the recipient of the NFT 320, such as an address of a cryptographic wallet associated with a recipient of the NFT. The transaction 300 may comprise an identifier associated with a holder (e.g., sender, transferor) of the NFT 330, such as a public key of the sender of the NFT and/or an address of a cryptographic wallet associated with the sender of the NFT. The transaction 300 may show a balance of the recipient and/or a balance of the holder. For example, the balance of the recipient may add or include the NFT and the NFT may be removed or absent from the balance of the holder to represent the transfer of the NFT from the holder to the recipient.

The transaction 300 may comprise a denomination of cryptocurrency 340. The cryptocurrency 340 may incentivize nodes to validate the transaction and/or add the transaction to a block on a blockchain. The recipient of the NFT may pay for the NFT, such as by transferring cryptocurrency to the sender in another transaction. The sender of the NFT may return a nominal amount of cryptocurrency 340 back in the NFT transaction 300 in order to ensure that the transaction is added to the blockchain, such as by enticing miner nodes (e.g., mining rigs, mining devices, etc.) to validate the transaction in order to take part of the cryptocurrency 340 as a fee. Alternatively, both parties may pay a denomination of cryptocurrency 340 for the transaction 300 to be validated and added to a block.

If the transaction 300 is part of a smart contract, a self-executing contract on a blockchain, the transaction 300 may be generated and broadcast to the distributed network based on the other transaction (e.g., the paying for the NFT) being executed, validated, and/or added to the blockchain. For example, the transaction 300 may have a piece of information, such as the wallet address of the recipient 320, missing. The transaction 300 may instead make reference to the payment transaction, which may not yet have been executed. When the payment transaction is executed, the payment transaction may comprise the missing information (e.g., the wallet address of the recipient 320) and the transactions may be referenced jointly to effect the transfer of the NFT. When the transaction 300 is added to the blockchain, the NFT may be transferred from the cryptographic wallet of the sender to the cryptographic wallet of the recipient.

The transaction 300 and/or a portion of the transaction 300 may be signed with a digital signature 350, such as a digital signature of the holder of the NFT. The digital signature 350 may comprise encryption with a private key of the holder of the NFT. The digital signature 350 may be authenticated by decrypting the signed portion of the transaction 300 using the public key of the holder of the NFT. The digital signature 350 may allow for authentication of the NFT (e.g., of its originality or genuineness, that it came from the holder) and/or of proof of ownership of the NFT (e.g., proof that the NFT was transferred to the recipient).

The transaction 300 may be received by a node of a distributed system (e.g., a node 110 in the system 100 in FIG. 1). The transaction 300 may be validated and may be stored in a block of a blockchain (e.g., blocks 210, 220, 230, 240 in blockchain 200 in FIG. 2). Based on the transaction 300 being stored to the blockchain, ownership of the NFT may be transferred to the recipient. Based on the transaction 300 being stored to the blockchain, an indication of the NFT may be displayed in the wallet of the recipient. The wallet may comprise software or hardware that stores an indication of the NFT's and cryptocurrency that a user owns and public/private keys associated with the user. The recipient may use the NFT in accordance with a license associated with the NFT, such as by sharing, copying, transferring, or selling the NFT.

Figure 4:
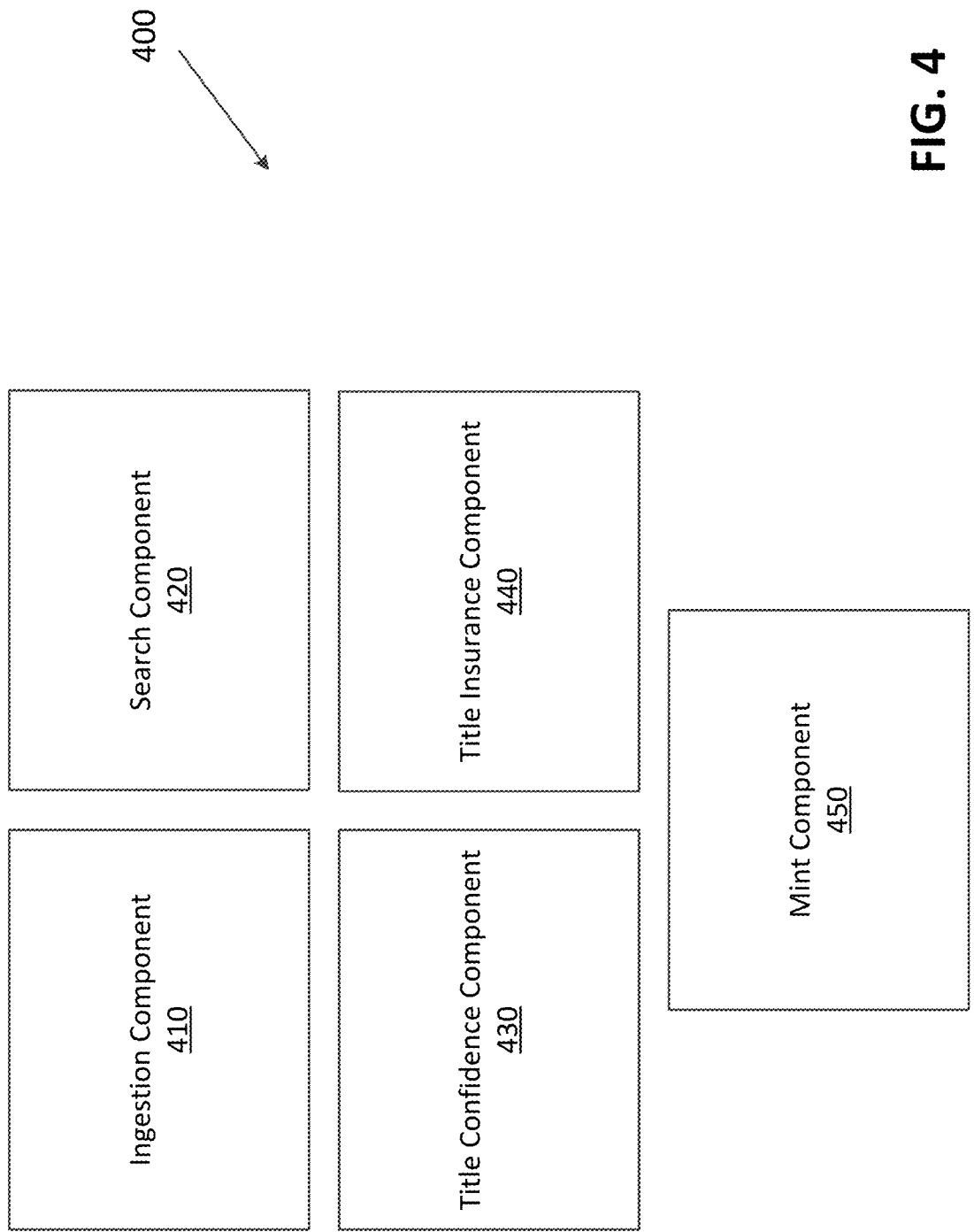
FIG. 4 shows an example system for titles and title insurance for NFT's.

FIG. 4 shows an example system for titles and title insurance for NFT's 400. Components of the system 400 may comprise different computing devices or parts of a same computing device. The system 400 may comprise a mint component 450. The mint component 450 may comprise a node of a distributed system (e.g., nodes 110 in FIG. 1) or a miner device. The mint component 450 may comprise a computer, such as a desktop computer, a mining rig, and/or a server.

The mint component 450 may be configured to mint an NFT. The NFT may comprise a token, a blockchain transaction, metadata that describes property (e.g., a digital asset, a physical asset), and/or a cryptographic signature that when decoded points to an internet hosting location (e.g., of property). The NFT may represent title to property. The property may comprise a particular digital asset (e.g., an image, gif, video, audio, game, ticket, and/or another type of digital files) or a particular physical asset. The NFT's ownership or placement on a blockchain may indicate the holder of the property's title, and changes thereto can be used to reflect a transfer of the property from one user to another user.

The NFT may comprise a token, such as an ERC-721 token, an ERC-1155 token, and/or a form cryptocurrency. The mint component 450 may be configured to generate, validate, and/or transmit a blockchain transaction and/or smart contract associated with the NFT. The mint component 450 may be a component of a cryptocurrency wallet. The mint component 450 may have access to a blockchain and/or a cryptocurrency wallet.

The system 400 may comprise an ingestion component 410. The ingestion component 410 may comprise a computer, such as a desktop computer, a mining rig, and/or a server. The ingestion component 410 may comprise a component of the same device of the mint component 450. The ingestion component 410 may comprise a different device than the mint component 450.

The ingestion component 410 may be configured to receive the NFT. The ingestion component 410 may be configured to receive the NFT from the mint component 450. The ingestion component 410 may be configured to receive the NFT by finding the transaction and/or smart contract associated with the NFT on the blockchain. The ingestion component 410 may be configured to monitor the blockchain for transactions of NFT's. The ingestion component 410 may be configured to receive the NFT from a user device, such as from a laptop computer, a desktop device, or a mobile phone. The ingestion component 410 may be configured to receive the NFT via a wallet on a user device.

The system 400 may comprise a search component 420. The search component 420 may comprise a computer, such as a desktop computer, a mining rig, and/or a server. The search component 420 may comprise a component of the same device of the mint component 450 and/or the ingestion component 410. The ingestion component 410 may comprise a different device than the mint component 450 and/or the ingestion component 410.

The search component 420 may be configured to conduct a search of the title to the property. The search may be an active search, such as a search of existing records and/or a one-time search. The search may be a passive search, such as a continuous search performed using saved search terms and/or a search performed on new or changed records. The search component 420 may be configured to conduct the search based on receiving an indication of the NFT and/or the title to the property, such as from the ingestion component 410. The search component 420 may be configured to conduct the search using an interface to an owner of the property, a title company, a lender, public records, government auditor, and/or a database. The search component 420 may be configured to conduct the search using one or more search terms. The search terms may comprise information from the transaction associated with the NFT, such as an identifier of the NFT, an identifier of a holder of the NFT, a web address of the asset, or a unique token ID. The search component 420 may obtain the search terms from the transaction, such as by monitoring and/or searching the blockchain and/or reviewing a history of the transaction in a user's wallet. The search terms may comprise a description of the property, a name of the owner of the property, and/or a name of the recipient of the property. In embodiments, search component 420 can receive one or more prior searches or results thereof, which can be combined or used in connection with other or current searching.

The system 400 may comprise a title confidence component 430. The title confidence component 430 may comprise a computer, such as a desktop computer, a mining rig, and/or a server. The title confidence component 430 may comprise a component of the same device of the mint component 450, the ingestion component 410, and/or the search component 420. The ingestion component 410 may comprise a different device than the mint component 450, the ingestion component 410, and/or the search component 420. The title confidence component 430 and/or system 400 can be configured to receive data such as that described hereafter that is used to determine title confidence. In embodiments, system 400 can include application programming interfaces (APIs) configured to access third-party systems, such as title company records, auditor or county records, other government records, electronic stores of records or electronic safety deposit boxes, blockchains containing real estate, et cetera, to request, collect, or receive information used in determining title confidence associated with a title represented in an NFT on a blockchain.

The title confidence component 430 may be configured to determine a title confidence. In embodiments, the title confidence can be a dynamic title confidence. The title confidence may comprise a numerical value, such as on a scale of 0-10, 0%-100%, etc. The title confidence may comprise a binary value, such as yes/no, 0/1, +/−, etc. The title confidence may comprise a descriptor, such as high confidence, medium confidence, low confidence, or no confidence. The title confidence may comprise an expression of a level of certainty that the property has clear title. The title confidence may comprise an expression of a level of certainty that the property is authentic and/or exists. The title confidence may comprise an expression of a level of certainty that the property is unique. The title confidence may comprise an expression of a level of certainty that the transferor of the NFT owned the property or has authority to convey the property.

The title confidence component 430 may be configured to determine the title confidence based on the search of the title to the property and/or results of the search. The title confidence component 430 may be configured to determine the title confidence based receiving an indication of the search of the title to the property and/or results of the search received from the search component 420. The title confidence component 430 may be configured to determine the title confidence based on statutory times for when titles are extinguished, previous disputes or inconsistencies in title, and/or a jurisdictional title confidence model with a time variable. The title confidence component 430 may be configured to determine the title confidence based on the amount of information found in the search. For example, the title confidence may be higher based on number of search hits indicating that the transferor of the NFT owned the property. The confidence number may be higher based on an absence of search hits indicating that the title to the property is not clear, such as search hits indicating that the property is the subject of a dispute or search hits indicating fraud associated with the NFT transferor and/or property.

The title confidence component 430 may be configured to continuously determine or redetermine dynamic title confidence. For example, the title confidence component 430 may redetermine the dynamic title confidence based on new and/or additional search results, such as from the search component 420. The new and/or additional search results may be a result of the search component 420 performing an additional search and/or receiving hits to a saved search. The title confidence component 430 may redetermine the dynamic title confidence based on the previous search results and the new and/or additional search results. The title confidence component may redetermine the dynamic title confidence based on the passage of time and various statutes or rules relating to title.

The system 400 may comprise a title insurance component 440. The title insurance component 440 may be configured to determine a premium for insurance of the NTF, the title, and/or the property. The title insurance component 440 may be configured to determine the premium based on the dynamic title confidence. The title insurance component 440 may be configured to determine the premium based on receiving an indication of the dynamic title confidence from the title confidence component 430. The title insurance component 440 may be configured to determine the premium based on risk associated with the dynamic title confidence. For example, the confidence component 430 may be configured to determine a higher premium based on the dynamic title confidence indicating a high level of certainty of clear title, authenticity, ownership, etc. The title insurance component 440 may determine an insurance coverage amount and/or a deductible amount based on the dynamic title confidence.

The title insurance component 440 may be configured to redetermine the premium based on a change in the title confidence. The title insurance component 440 may be configured to redetermine the premium based receiving an indication of a change in the title confidence from the title confidence component 430. In embodiments, premiums can vary inversely with title confidence, i.e., providing a lower cost to reflect the lower risk associated with a higher title confidence. In embodiments, one or more thresholds can be employed with relation to premium cliffs or tiers of premiums. For example, a flat premium can be offered for titles with confidence below seventy-five percent; a different flat or dynamic premium (i.e., premium reduces continuously in a linear or nonlinear fashion corresponding to increasing confidence) can be offered for titles with confidence between seventy-five and ninety-five percent; a lower premium can be offered for titles with confidence above ninety-five percent; and a lower premium still for titles with confidence above ninety-nine percent. Other arrangements will be apparent to those of skill in the art on review of the disclosures herewith.

Figure 5:
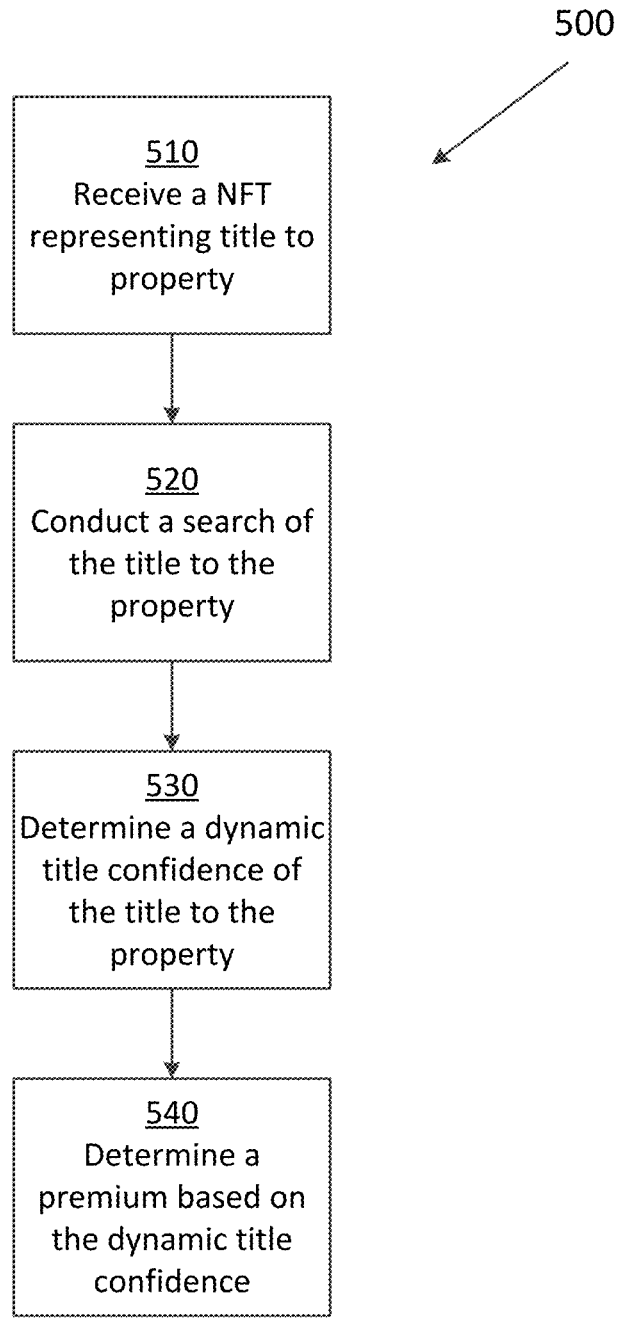
FIG. 5 shows an example method for titles and title insurance for NFT's.

FIG. 5 shows a method for titles and title insurance for NFT's 500. The method 500 may be performed by the system 400 in FIG. 4. At step 510, an NFT may be received. The NFT may represent title to property. The NFT may comprise a token, such as an ERC-721 token and/or a form cryptocurrency. The property may comprise a particular digital asset (e.g., an image, gif, video, audio, game, ticket, and/or another type of digital files) or a particular physical asset. The NFT may be received by an ingestion component, such as ingestion component 410 in FIG. 4. The NFT may be received from a minting component. The NFT may comprise an indication of a transfer of the property from a first user to a second user. The NFT may comprise a blockchain transaction and/or a smart contract. The NFT may be received by monitoring the blockchain for transactions of NFT's. The NFT may be received from a user device, such as a laptop computer, a desktop device, and/or a mobile phone. The NFT may be received via a wallet on a user device.

At step 520, a search of the title may be conducted. The search may be conducted based on the NFT being received in step 510. The search may be conducted by a search component, such as search component 420 in FIG. 4. The search may be conducted using an interface to an owner of the property, a title company, a lender, public records, a government auditor, and/or another database. The search may be an active search, such as a search of existing records and/or a one-time search. The search may be a passive search, such as a continuous search performed using saved search terms and/or a search performed on new or changed records. The search may be conducted using one or more search terms. The search terms may comprise information from the transaction associated with the NFT, such as an identifier of the NFT, an identifier of a holder of the NFT, a web address of the asset, or a unique token ID. The search terms may be obtained from the transaction, such as by monitoring and/or searching the blockchain and/or reviewing a history of the transaction in a user's wallet. The search terms may comprise a description of the property, a name of the owner of the property, and/or a name of the recipient of the property.

In embodiments, method 500 can utilize various databases, plugins, APIs, or other resources to request, access, retrieve, receive, or otherwise utilize title information from multiple sources such as public records or other government sources, title company records, private party records, blockchains, et cetera.

At step 530, a title confidence of the title may be determined. In embodiments, the title confidence can be dynamic. The title confidence may be determined based on the search of the title. The title confidence may be determined by a title confidence component, such as the title confidence component 430 in FIG. 4. The title confidence may comprise a numerical value, such as on a scale of 0-10, 0%-100%, etc. The title confidence may comprise a binary value, such as yes/no, 0/1, +/−, etc. The title confidence may comprise a descriptor, such as high confidence, medium confidence, low confidence, or no confidence. The title confidence may comprise an expression of a level of certainty that the property has clear title. The title confidence may comprise an expression of a level of certainty that the property is authentic and/or exists. The title confidence may comprise an expression of a level of certainty that the property is unique. The title confidence may comprise an expression of a level of certainty that the transferor of the NFT owned the property or has authority to convey the property. The title confidence may be determined based on statutory times for when titles are extinguished, previous disputes or inconsistencies in title, and/or a jurisdictional title confidence model with a time variable.

The title confidence may be determined based on the amount of information found in the search. For example, the title confidence may be higher based on number of search hits indicating that the transferor of the NFT owned the property. The dynamic confidence number may be higher based on an absence of search hits indicating that the title to the property is not clear, such as search hits indicating that the property is the subject of a dispute or search hits indicating fraud associated with the NFT transferor and/or property.

At step 540, a premium for the title may be determined. The premium may comprise a premium to insure the title. The premium may be determined based on the title confidence. The premium may be determined by a title insurance component, such as the title insurance component 440 in FIG. 4. The premium may be determined based on risk associated with the title confidence. For example, a higher premium may be determined based on the title confidence indicating a high level of certainty of clear title, authenticity, ownership, etc. An insurance coverage amount and/or a deductible amount may be determined based on the title confidence.

The title confidence may be dynamic and continuously determined or redetermined. For example, the title confidence may be redetermined based on new and/or additional search results, such as from the search component 420. The new and/or additional search results may be a result of an additional search and/or receiving hits to a saved search. The dynamic title confidence may be redetermined based on the previous search results and the new and/or additional search results.

Figure 6:
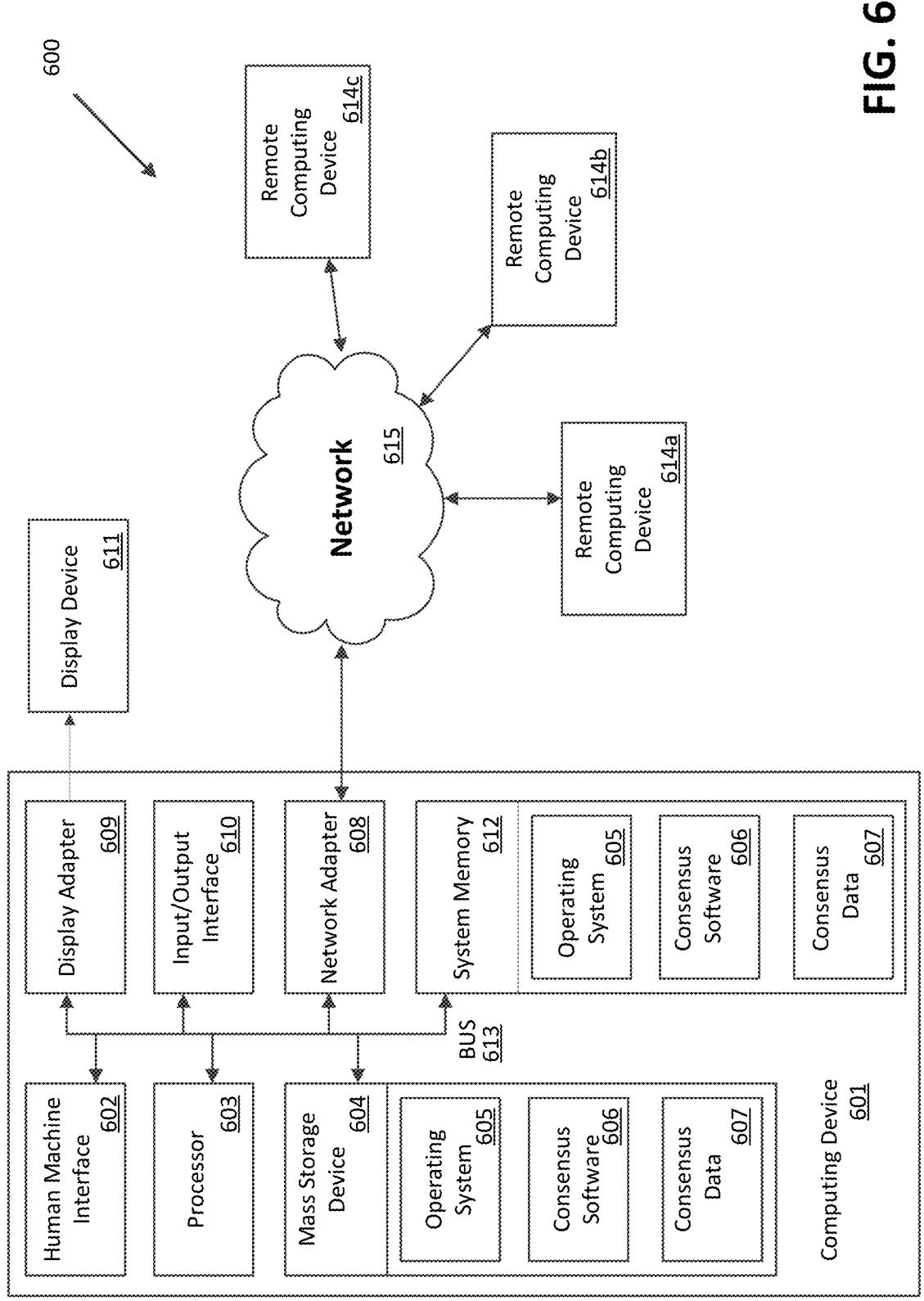
FIG. 6 shows an example computing environment.

FIG. 6 shows a block diagram illustrating an exemplary operating environment 600 for performing the disclosed methods of title and title insurance for NFT's. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that performs particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods disclosed herein may be implemented via a general-purpose computing device in the form of a computing device 601. The components of the computing device 601 may comprise, but are not limited to, one or more processors or processing units 603, a system memory 612, and a system bus 613 that couples various system components including the processor 603 to the system memory 612. In the case of multiple processing units 603, the system may utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description may also be implemented over a wired or wireless network connection and each of the subsystems, including the processor 603, a mass storage device 604, an operating system 605, entitlement software 606, entitlement data 607, a network adapter 608, system memory 612, an Input/Output Interface 610, a display adapter 609, a display device 611, and a human machine interface 602, may be contained within one or more remote computing devices 614a,b,c at physically separate locations, connected through buses of this form, in effect implementing a fully distributed system.

The computing device 601 typically comprises a variety of computer readable media. Exemplary readable media may be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as entitlement data 607 and/or program modules such as operating system 605 and entitlement software 606 that are immediately accessible to and/or are presently operated on by the processing unit 603.

In another aspect, the computing device 601 may also comprise other removable/non-removable, volatile/non-volatile computer storage media. By way of example, FIG. 6 illustrates a mass storage device 604 which may provide non-volatile storage of computer code, computer readable instructions, data structures, program modules, and other data for the computing device 601. For example and not meant to be limiting, a mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 604, including by way of example, an operating system 605 and entitlement software 606. Each of the operating system 605 and entitlement software 606 (or some combination thereof) may comprise elements of the programming and the entitlement software 606. Entitlement data 607 may also be stored on the mass storage device 604. Entitlement data 607 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

In another aspect, the user may enter commands and information into the computing device 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the processing unit 603 via a human machine interface 602 that is coupled to the system bus 613, but may be connected by other interface and bus structures, such as a parallel port, game port, an IEEE 694 Port (also known as a Firewire port), a serial port, or a universal serial bus (USB).

In yet another aspect, a display device 611 may also be connected to the system bus 613 via an interface, such as a display adapter 609. It is contemplated that the computing device 601 may have more than one display adapter 609 and the computer 601 may have more than one display device 611. For example, a display device may be a monitor, an LCD (Liquid Crystal Display), or a projector. In addition to the display device 611, other output peripheral devices may comprise components such as speakers (not shown) and a printer (not shown) which may be connected to the computing device 601 via Input/Output Interface 610. Any step and/or result of the methods may be output in any form to an output device. Such output may be any form of visual representation, including, but not limited to, textual, graphical, animation, audio, tactile, and the like. The display 611 and computing device 601 may be part of one device, or separate devices.

The computing device 601 may operate in a networked environment using logical connections to one or more remote computing devices 614a,b,c. By way of example, a remote computing device may be a personal computer, portable computer, a smart phone, a server, a router, a network computer, a peer device or other common network node, and so on. Logical connections between the computing device 601 and a remote computing device 614a,b,c may be made via a network 615, such as a local area network (LAN) and a general wide area network (WAN). Such network connections may be through a network adapter 608. A network adapter 608 may be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of entitlement software 606 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information, and which may be accessed by a computer.

The invention claimed is:

1. A system comprising:
a network interface configured to receive data over a communications network; and
a computing device comprising one or more processors and instructions, that when executed by the one or more processors, cause the computing device to:
receive a non-fungible token (NFT) comprising a title to a property;
determine that a blockchain comprises an indication of the NFT, wherein the blockchain comprises a plurality of hashed blocks and the indication of the NFT is stored in a hashed block of the blockchain;
determine, based at least in part on the hashed block of the blockchain, transaction-related information associated with the property;
performing, based at least in part on the transaction-related information associated with the property, a search for title-related information associated with the property;
determine, based at least in part on the title-related information, a dynamic title confidence value;
determine a premium based on the dynamic title confidence value;
receive an indication of a change to the dynamic title confidence value; and
redetermine the premium based on the change to the dynamic title confidence value.

2. The system of claim 1, wherein the search is associated with an interface to one or more of an owner of the property, a title company, a lender, public records, or a government auditor.

3. The system of claim 1, wherein the dynamic title confidence value is determined based on at least one of statutory times for when titles are extinguished, previous disputes or inconsistencies in title, or a jurisdictional title confidence model with a time variable.

4. The system of claim 1, wherein the premium is determined based on risk associated with the dynamic title confidence value.

5. The system of claim 1, wherein the instructions, when executed by the one or more processors, further cause the computing device to mint the NFT.

6. The system of claim 1, wherein the NFT comprises an indication of a transfer of the property from a first user to a second user.

7. The system of claim 1, wherein the NFT comprises a smart contract.

8. A method comprising:
receiving a non-fungible token (NFT) representing title to property;
determining that a blockchain comprises an indication of the NFT, wherein the blockchain comprises a plurality of hashed blocks and the indication of the NFT is stored in a hashed block of the blockchain;
determining, based at least in part on the hashed block of the blockchain, transaction-related information associated with the property;
performing, based at least in part on the transaction-related information associated with the property, a search for title-related information associated with the property;
determining, based at least in part on the title-related information, a dynamic title confidence value;
determining a premium based on the dynamic title confidence value;

receiving an indication of a change to the dynamic title confidence value; and redetermining the premium based on changes to the dynamic title confidence value.

9. The method of claim 8, wherein the search is associated with an interface to at least one of an owner of the property, a title company, a lender, public records, or a government auditor.

10. The method of claim 8, wherein the dynamic title confidence value is determined based on at least one of statutory times for when titles are extinguished, previous disputes or inconsistencies in title, or a jurisdictional title confidence model with a time variable.

11. The method of claim 8, wherein the premium is determined based on risk associated with the dynamic title confidence value.

12. The method of claim 8, further comprising minting the NFT.

13. The method of claim 8, wherein the NFT comprises an indication of a transfer of the property from a first user to a second user.

14. The method of claim 8, wherein the NFT comprises a smart contract.

15. A non-transitory computer readable storage medium, storing instructions that, when executed, cause:

receiving a non-fungible token (NFT) representing title to property;

determining that a blockchain comprises an indication of the NFT, wherein the blockchain comprises a plurality of hashed blocks and the indication of the NFT is stored in a hashed block of the blockchain;

determining, based at least in part on the hashed block of the blockchain, transaction-related information associated with the property;

performing, based at least in part on the transaction-related information associated with the property, a search for title-related information associated with the property;

determining, based at least in part on the title-related information, a dynamic title confidence value;

determining a premium based on the dynamic title confidence value;

receiving an indication of a change to the dynamic title confidence value; and redetermining the premium based on changes to the dynamic title confidence value.

16. The non-transitory computer readable storage medium of claim 15, wherein the search is associated with an interface to at least one of an owner of the property, a title company, a lender, public records, or a government auditor.

17. The non-transitory computer readable storage medium of claim 15, wherein the dynamic title confidence value is determined based on at least one of statutory times for when titles are extinguished, previous disputes or inconsistencies in title, or a jurisdictional title confidence model with a time variable.

18. The non-transitory computer readable storage medium of claim 15, wherein the premium is determined based on risk associated with the dynamic title confidence value.

19. The non-transitory computer readable storage medium of claim 15, further comprising minting the NFT.

20. The non-transitory computer readable storage medium of claim 15, wherein the NFT comprises an indication of a transfer of the property from a first user to a second user.

* * * * *